United States Patent
Guthrie et al.

(10) Patent No.: US 7,451,277 B2
(45) Date of Patent: Nov. 11, 2008

(54) DATA PROCESSING SYSTEM, CACHE SYSTEM AND METHOD FOR UPDATING AN INVALID COHERENCY STATE IN RESPONSE TO SNOOPING AN OPERATION

(75) Inventors: Guy L. Guthrie, Austin, TX (US); William J. Starke, Round Rock, TX (US); Jeffrey A. Stuecheli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 11/388,017

(22) Filed: Mar. 23, 2006

(65) Prior Publication Data
US 2007/0226427 A1 Sep. 27, 2007

(51) Int. Cl.
G06F 12/00 (2006.01)
(52) U.S. Cl. ............... 711/146; 711/119; 711/141; 711/144
(58) Field of Classification Search .............. None
See application file for complete search history.

(56) References Cited
U.S. PATENT DOCUMENTS
5,852,716 A * 12/1998 Hagersten ............ 709/201

2007/0204110 A1 * 8/2007 Guthrie et al. ............ 711/141

* cited by examiner

Primary Examiner—Reginald G. Bragdon
Assistant Examiner—Shawn X Gu
(74) Attorney, Agent, or Firm—Casimer K. Salys; Dillon & Yudell LLP

(57) ABSTRACT

A cache coherent data processing system includes at least first and second coherency domains. In a first cache memory within the first coherency domain of the data processing system, a coherency state field associated with a storage location and an address tag is set to a first data-invalid coherency state that indicates that the address tag is valid and that the storage location does not contain valid data. In response to snooping an exclusive access operation, the exclusive access request specifying a target address matching the address tag and indicating a relative domain location of a requester that initiated the exclusive access operation, the first cache memory updates the coherency state field from the first data-invalid coherency state to a second data-invalid coherency state that indicates that the address tag is valid, that the storage location does not contain valid data, and whether a target memory block associated with the address tag is cached within the first coherency domain upon successful completion of the exclusive access operation based upon the relative location of the requestor.

1 Claim, 12 Drawing Sheets

DATA PROCESSING SYSTEM, CACHE SYSTEM AND METHOD FOR UPDATING AN INVALID COHERENCY STATE IN RESPONSE TO SNOOPING AN OPERATION

CROSS-REFERENCE TO RELATED APPLICATION(S)

The present application is related to the following pending patent applications, which are assigned to the assignee of the present invention and incorporated herein by reference in their entireties:

(1) U.S. patent application Ser. No. 11/140,821; and
(2) U.S. patent application Ser. No. 11/055,305.

BACKGROUND OF THE INVENTION

1. Technical Field

The present invention relates in general to data processing and, in particular, to data processing in a cache coherent data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherency states stored in association with the cache lines of each cache hierarchy, as well as a set of coherency messages utilized to communicate the cache state information between cache hierarchies. In a typical implementation, the coherency state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

In some cache coherency protocols, one or more coherency states are imprecisely formed and/or updated in response to subsequent operations. Consequently, these coherency states may not accurately reflect a system-wide coherency state of the associated memory blocks. The present invention recognizes that the existence of imprecise or inaccurate coherency states, even if not causing coherency errors, can lead to system operations being performed that would otherwise not be required if the imprecise coherency states were reduced or eliminated.

SUMMARY OF THE INVENTION

In view of the foregoing, the present invention provides an improved cache coherent data processing system, cache system and method of data processing in a cache coherent data processing system.

In one embodiment, a cache coherent data processing system includes at least first and second coherency domains. In a first cache memory within the first coherency domain of the data processing system, a coherency state field associated with a storage location and an address tag is set to a first data-invalid coherency state that indicates that the address tag is valid and that the storage location does not contain valid data. In response to snooping an exclusive access operation, the exclusive access request specifying a target address matching the address tag and indicating a relative location of a requester that initiated the exclusive access operation, the first cache memory updates the coherency state field from the first data-invalid coherency state to a second data-invalid coherency state that indicates that the address tag is valid, that the storage location does not contain valid data, and whether a target memory block associated with the address tag is cached within the first coherency domain upon successful completion of the exclusive access operation based upon the relative location of the requester. By updating the data-invalid coherency state, the precision of the hint information provided by the data-invalid coherency states is enhanced, leading to improved selection of broadcast scopes for subsequent data access operations.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

I. Exemplary Data Processing System

Figure 1:
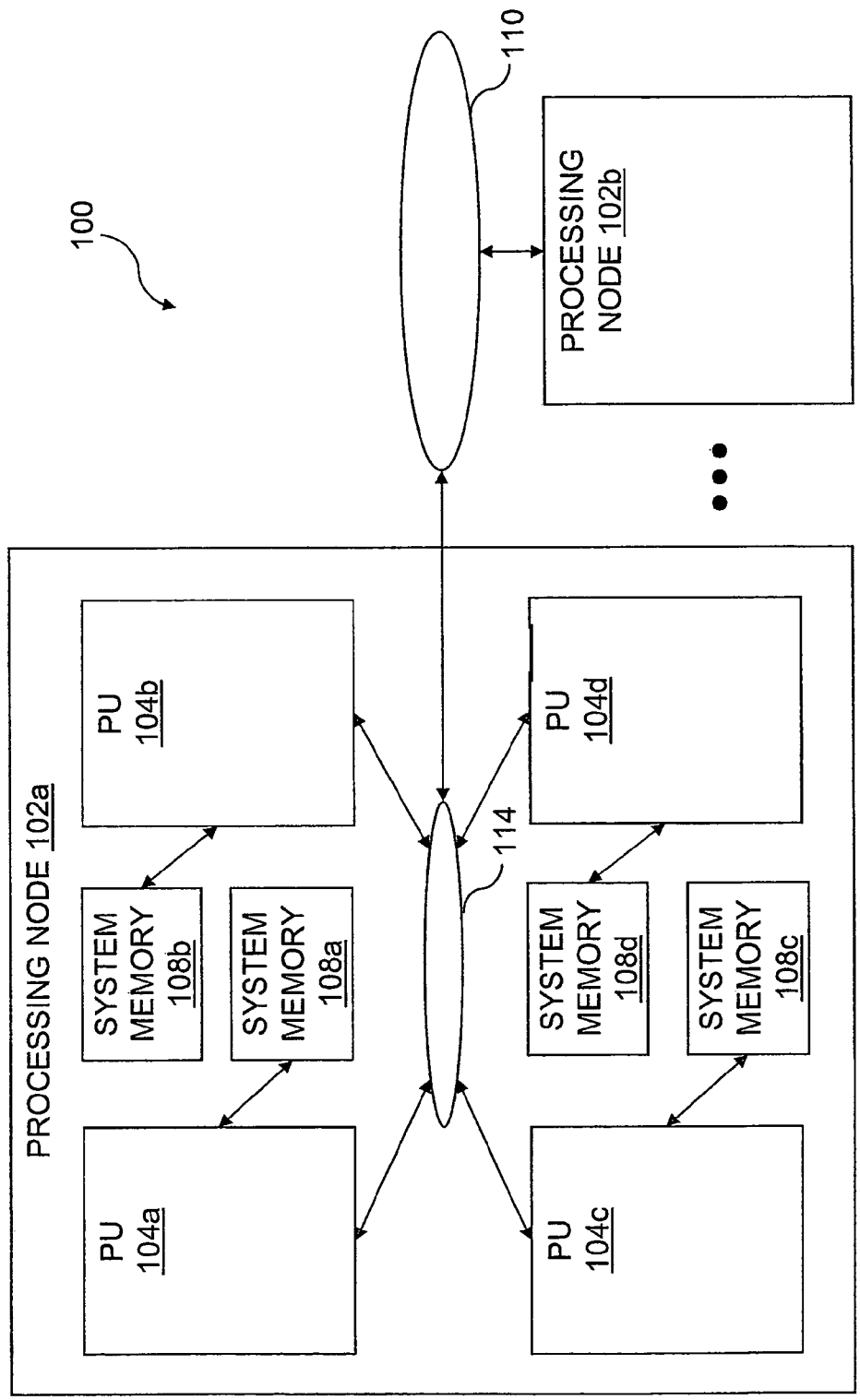
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
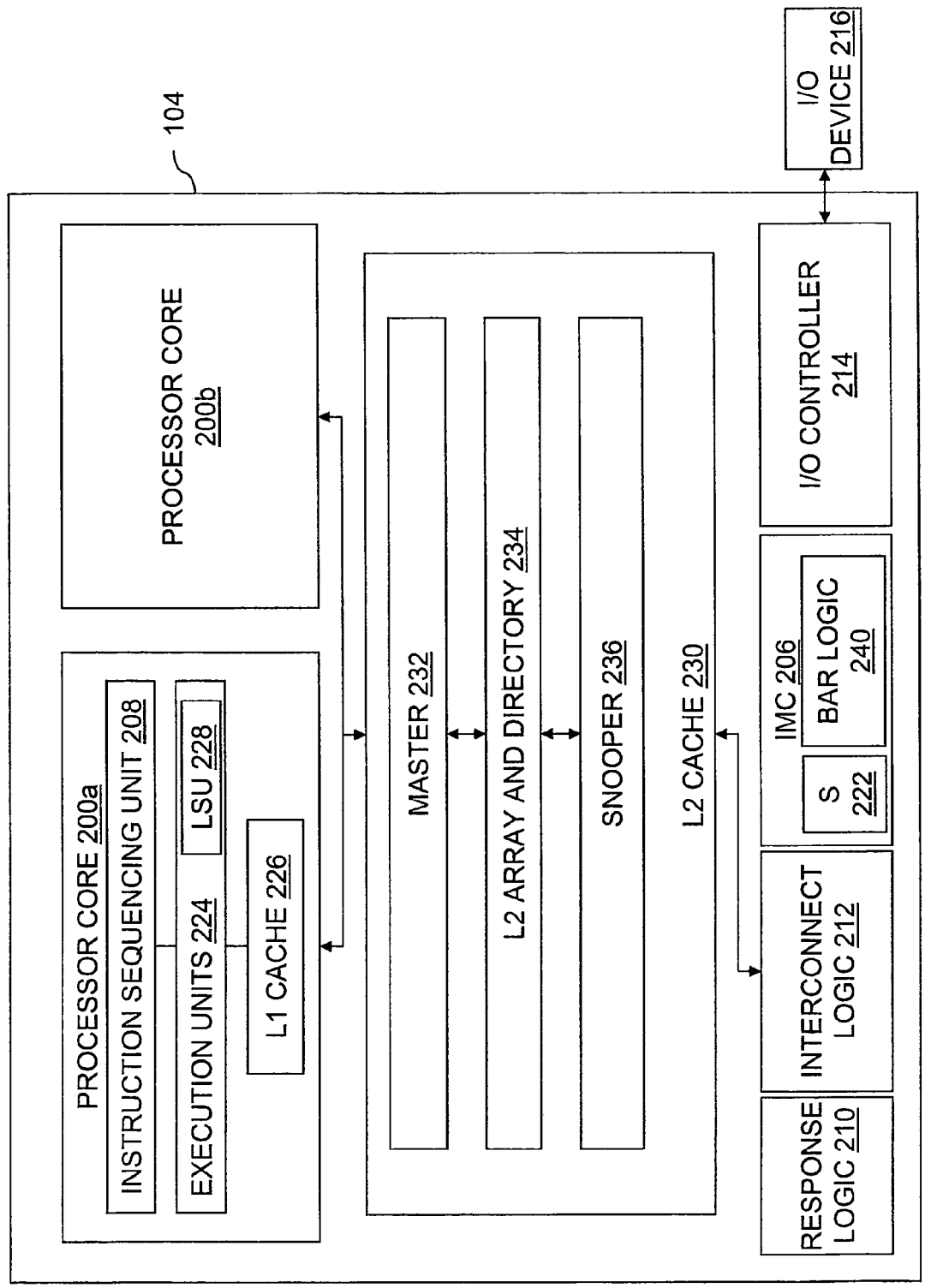
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. As discussed further below, execution units 224 preferably include a load-store unit (LSU) 228 for executing memory access instructions that references a memory block or cause the generation of an operation referencing a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 222 on the local interconnect 114. IMC 206 includes base address register (BAR) logic 240, which includes range registers defining the addresses for which IMC 206 is responsible.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line or lookaside cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
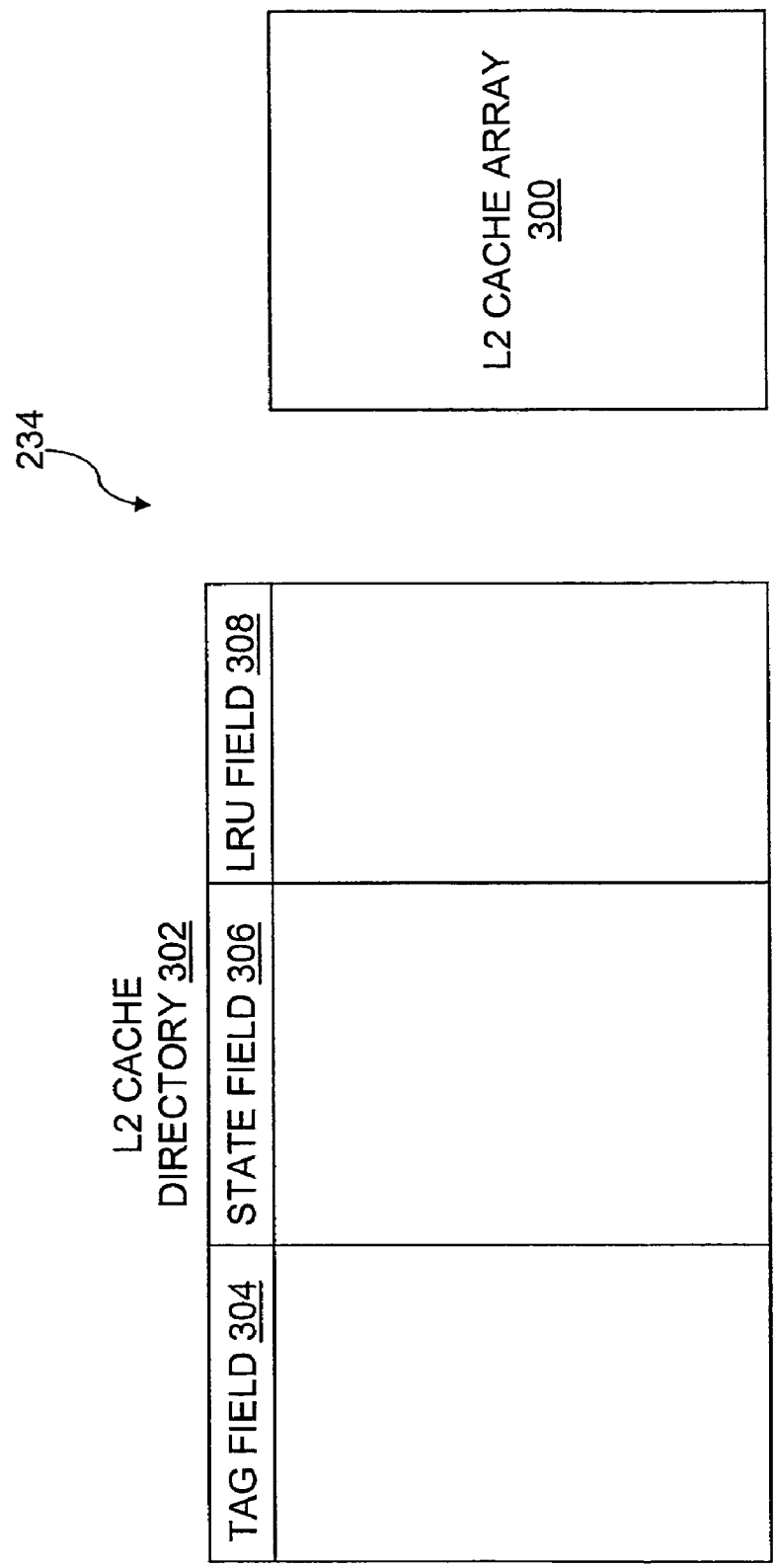
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

II. Exemplary Operation

Figure 4:
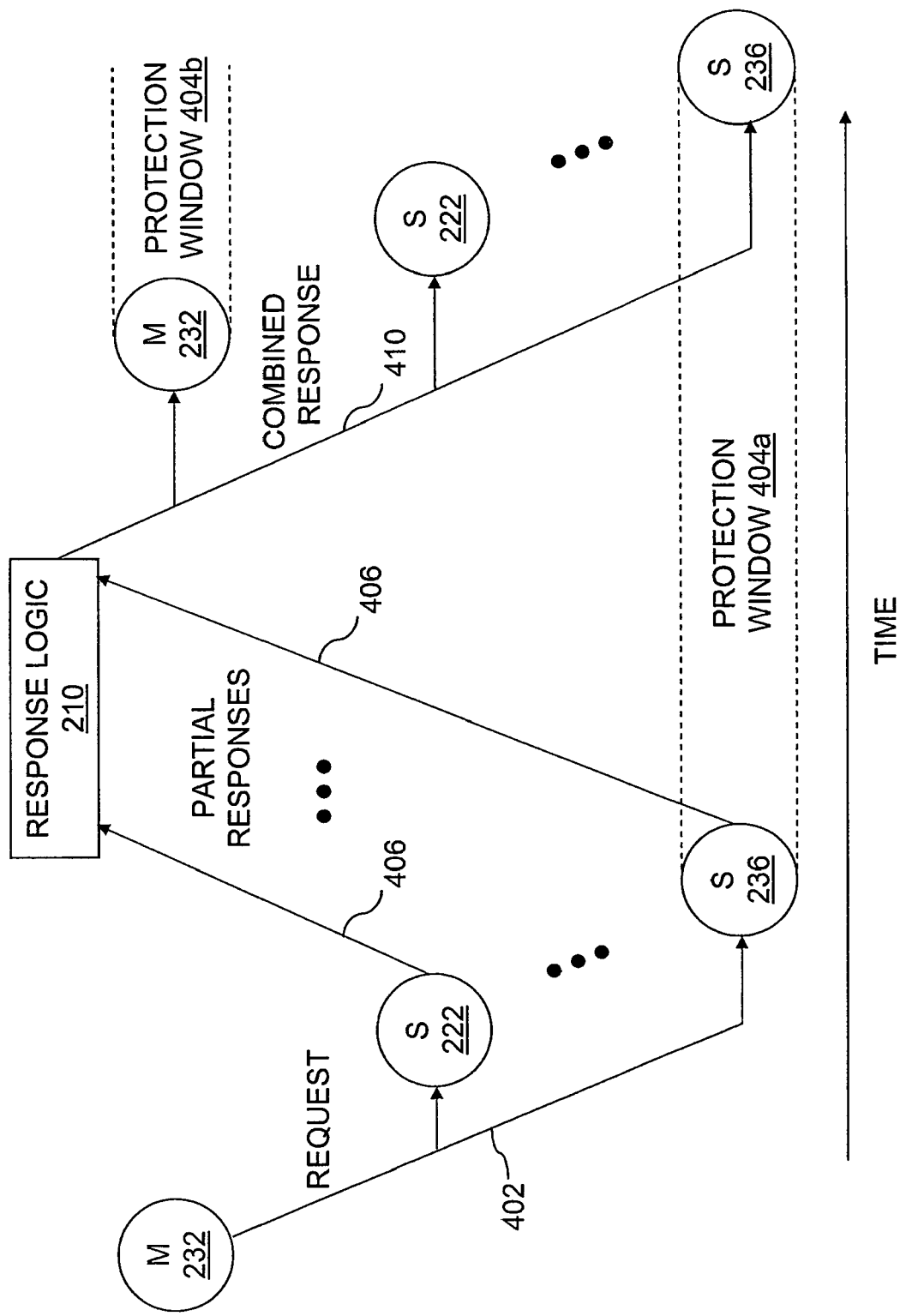
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
|---|---|
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique cached copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| KILL | Forces destruction of cached copies, if any, of a memory block not held in the cache hierarchy of the master |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. Each snooper 222, 236 that receives request 402 may provide a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" (e.g., KILL) operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. If required by request 402, a requested or target memory block may be transmitted to or from master 232 before or after the generation of combined response 410 by response logic 210.

In the following description, the partial response of a snooper 222, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that functions as the control point for the repository of a memory block. In the absence of a HPC for the memory block, the LPC controls access to the storage holding the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling a present inability to service the request due to absence of a required resource.

Hereafter, a snooper 222, 236 providing a partial response indicating that the snooper has available all internal resources required to presently service a request, if required, is said to "affirm" the request. For snoopers 236, partial responses affirming a snooped operation preferably indicate the cache state of the requested or target memory block at that snooper 236. A snooper 222, 236 providing a partial response indicating that the snooper 236 does not have available all internal resources required to presently service the request may be said to be "possibly hidden" or "unable" to service the request. Such a snooper 236 is "possibly hidden" or "unable" to service a request because the snooper 236, due to lack of an available instance of snoop logic or present access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, multiple L2 caches 230 distributed throughout data processing system 100 are permitted to hold copies of the same memory block in a "special" shared coherency state that permits these caches to supply the memory block to requesting L2 caches 230 using cache-to-cache intervention. In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master of the operation is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system. Examples of local and global operations are described in detail in U.S. patent application Ser. No. 11/055,305, which is incorporated herein by reference in its entirety.

In a preferred embodiment, the scope of an operation is indicated in a bus operation by a local/global scope indicator (signal), which in one embodiment may comprise a 1-bit flag. Forwarding logic 212 within processing units 104 preferably determines whether or not to forward an operation, received via local interconnect 114 onto system interconnect 110 based upon the setting of the local/global scope indicator (signal) in the operation.

In the present description, a coherency domain is referred to as the "home" coherency domain (or "home" node) of a memory block if the coherency domain (or processing node) contains the LPC of the memory block.

V. Domain Indicators

Figure 5:
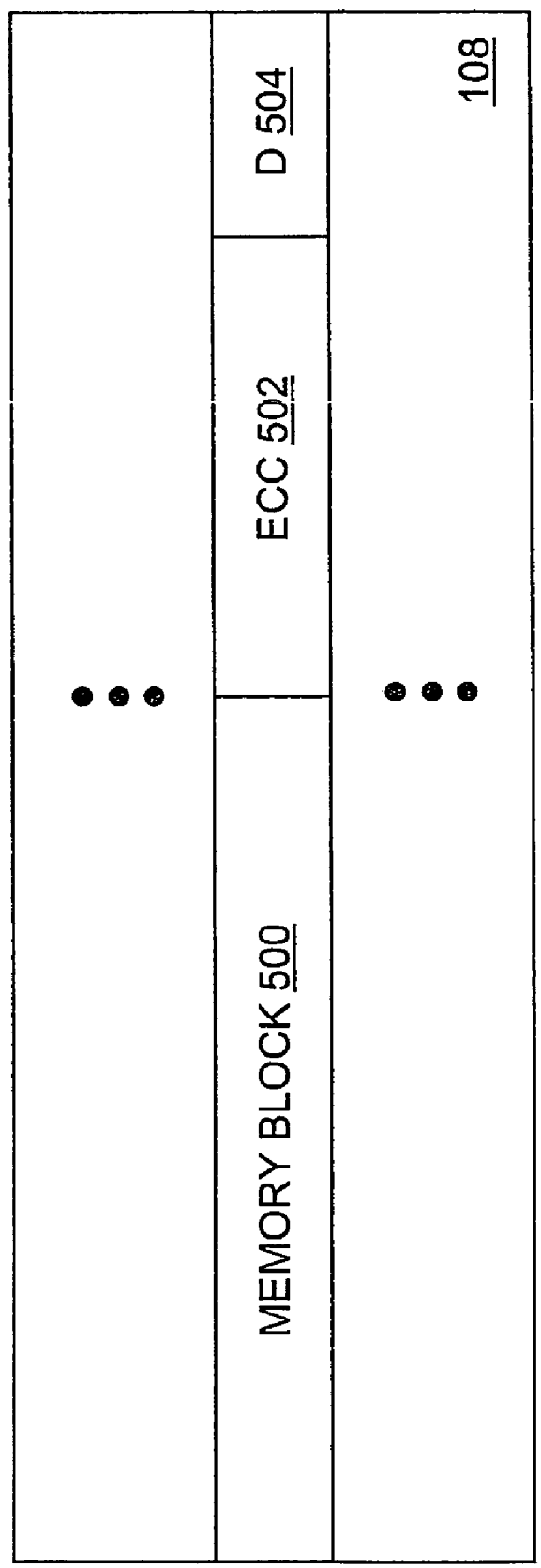
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | Unique? | Data source? | Consistent with LPC? | Cached outside local domain? | Legal concurrent states |
|---|---|---|---|---|---|---|
| M | yes | yes | yes, before CR | no | no | I, Ig, Igp, In (& LPC) |
| Me | yes | yes | yes, before CR | yes | no | I, Ig, Igp, In (& LPC) |
| T | yes | unknown | yes, after CR if none provided before CR | no | unknown | Sr, S, I, Ig, Igp, In (& LPC) |

TABLE II-continued

| Cache state | HPC? | Unique? | Data source? | Consistent with LPC? | Cached outside local domain? | Legal concurrent states |
|---|---|---|---|---|---|---|
| Tn | yes | unknown | yes, after CR if none provided before CR | no | no | Sr, S, I, Ig, Igp, In (& LPC) |
| Te | yes | unknown | yes, after CR if none provided before CR | yes | unknown | Sr, S, I, Ig, Igp, In (& LPC) |
| Ten | yes | unknown | yes, after CR if none provided before CR | yes | no | Sr, S, I, Ig, Igp, In (& LPC) |
| Sr | no | unknown | yes, before CR | unknown | unknown | T, Tn, Te, Ten, S, I, Ig, Igp, In (& LPC) |
| S | no | unknown | no | unknown | unknown | T, Tn, Te, Ten, Sr, S, I, Ig, Igp, In (& LPC) |
| I | no | n/a | no | n/a | unknown | M, Me, T, Tn, Te, Ten, Sr, S, I, Ig, Igp, In (& LPC) |
| Ig | no | n/a | no | n/a | Assumed so, in absence of other information | M, Me, T, Tn, Te, Ten, Sr, S, I, Ig, Igp, In (& LPC) |
| Igp | no | n/a | no | n/a | Assumed so, in absence of other information | M, Me, T, Tn, Te, Ten, Sr, S, I, Ig, Igp, In (& LPC) |
| In | no | n/a | no | n/a | Assumed not, in absence of other information | M, Me, T, Tn, Te, Ten, Sr, S, I, Ig, Igp, In (& LPC) |

A. Ig state

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in a coherency domain other than the home coherency domain. The Ig indication is preferably imprecise, meaning that it may be incorrect without a violation of coherency.

The Ig state is formed in a lower level cache in the home coherency domain in response to that cache providing a requested memory block to a requestor in another coherency domain in response to an exclusive access request (e.g., a bus RWITM operation).

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I, In or Igp entry is selected) in order to update the corresponding domain indicator 504 in system memory 108. Second, if a request that causes a memory block to be loaded into a cache hits on an Ig cache entry in that same cache, the cache treats the Ig hit as a cache miss and performs a castout operation with the Ig entry as the selected victim. The cache thus avoids avoid placing two copies of the same address tag in the cache directory. Third, the castout of the Ig state is preferably performed as a local-only operation limited in scope to the local coherency domain. Fourth, the castout of the Ig state is preferably performed as a dataless address-only operation in which the domain indication is written back to the domain indicator 504 in the LPC.

Implementation of an Ig state in accordance with the present invention improves communication efficiency by maintaining a cached domain indicator for a memory block in a home coherency domain even when no valid copy of the memory block remains cached in the home coherency domain. As described below, the cache domain indication provided by the Ig state can be utilized to predict a global broadcast scope on the interconnect fabric for operations targeting the associated memory block.

B. Igp state

The Igp (Invalid global predict-only) coherency state is utilized to maintain a cached domain indication in cases in which no copy of a memory block remains cached in a non-home coherency domain. The Igp state is defined herein as a cache coherency state indicating (1) the associated memory block in the cache array is invalid, (2) the address tag in the cache directory is valid, (3) the present coherency domain is not the home coherency domain, and (4) a copy of the memory block identified by the address tag may possibly be cached in a coherency domain other than the present non-home coherency domain. Although precisely formed, the Igp indication is preferably imprecisely maintained, meaning that it may be incorrect without a violation of coherency.

The Igp state is formed in a lower level cache in a non-home coherency domain in response to that cache providing coherency ownership of a requested memory block to a requestor in another coherency domain in response to an exclusive access request (e.g., a RWITM, DClaim, DCBZ, Kill, Write or Partial Write request).

Because cache directory entries including an Igp state carry potentially useful information, it is desirable in at least some implementations to preferentially retain entries in the Ig state over entries, if any, in the I state (e.g., by modifying the Least Recently Used (LRU) algorithm utilized to select a victim cache entry for replacement). As Igp directory entries are retained in cache, it is possible for some Igp entries to become "stale" over time in that a copy of the memory block may return to the coherency domain without snooping by the cache holding the address tag of the memory block in the Igp state. In such cases, the "stale" Igp state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Igp cache entries.

In contrast to the handling of Ig entries, no castout of Igp entries is performed in response to selection of an Igp entry as the victim for replacement, for example, in accordance with a replacement algorithm (e.g., LRU) or because a request that causes a memory block to be loaded into a cache hits on an Igp cache entry in that same cache. Instead, the Igp entry is simply deallocated. No castout is performed because Igp entries do not maintain a cached and possibly modified copy of the underlying domain indicators 504.

Implementation of an Igp state in accordance with the present invention improves communication efficiency by maintaining a cached domain indicator for a memory block in a non-home coherency domain for scope prediction purposes even when no valid copy of the memory block remains cached in the non-home coherency domain.

C. In state

The In state is defined herein as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. The In indication is preferably imprecise, meaning that it may be incorrect without a violation of coherency. The In state is formed in a lower level cache in response to that cache providing a requested memory block to a requester in the same coherency domain in response to an exclusive access request (e.g., a bus RWITM operation).

Because cache directory entries including an In state carry potentially useful information, it is desirable in at least some implementations to preferentially retain entries in the In state over entries in the I state (e.g., by modifying the Least Recently Used (LRU) algorithm utilized to select a victim cache entry for replacement). As In directory entries are retained in cache, it is possible for some In entries to become "stale" over time in that a cache whose exclusive access request caused the formation of the In state may itself supply a shared copy of the memory block to a remote coherency domain without notification to the cache holding the address tag of the memory block in the In state. In such cases, the "stale" In state, which incorrectly indicates that a local operation should be issued instead of a global operation, will not cause any coherency errors, but will merely cause some operations to be erroneously first issued as local operations, rather than as global operations. Occurrences of such inefficiencies will be limited in duration by the eventual replacement of the "stale" In cache entries. In a preferred embodiment, cache entries in the In coherency state are not subject to castout, but are instead simply replaced. Thus, unlike Ig cache entries, In cache entries are not utilized to update domain indicators 504 in system memories 108.

Implementation of an In state in accordance with the present invention improves communication efficiency by maintaining a cached domain indicator for a memory block that may be consulted by a master in order to select a local scope for one of its operations. As a consequence, bandwidth on system interconnect 110 and local interconnects 114 in other coherency domains is conserved.

D. Sr state

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a range indicator indicating whether the bus operation has crossed a domain boundary (e.g., an explicit domain identifier of the master or a single local/not local range bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
|---|---|---|---|
| "local" (i.e., within same domain) | Sr | Sr' affirm | Sr' possibly hidden |
| "remote" (i.e., not within same domain) | Sr | S' affirm | S' possibly hidden |
| "local" (i.e., within same domain) | S | S' affirm | S' possibly hidden |
| "remote" (i.e., not within same domain) | S | S' affirm | S' possibly hidden |

Assuming the response behavior set forth above in Table III, the average data latency for shared data can be significantly decreased by increasing the number of shared copies of memory blocks distributed within an SMP data processing system that may serve as data sources.

VII. Exemplary Exclusive Access Operation

Figure 6:
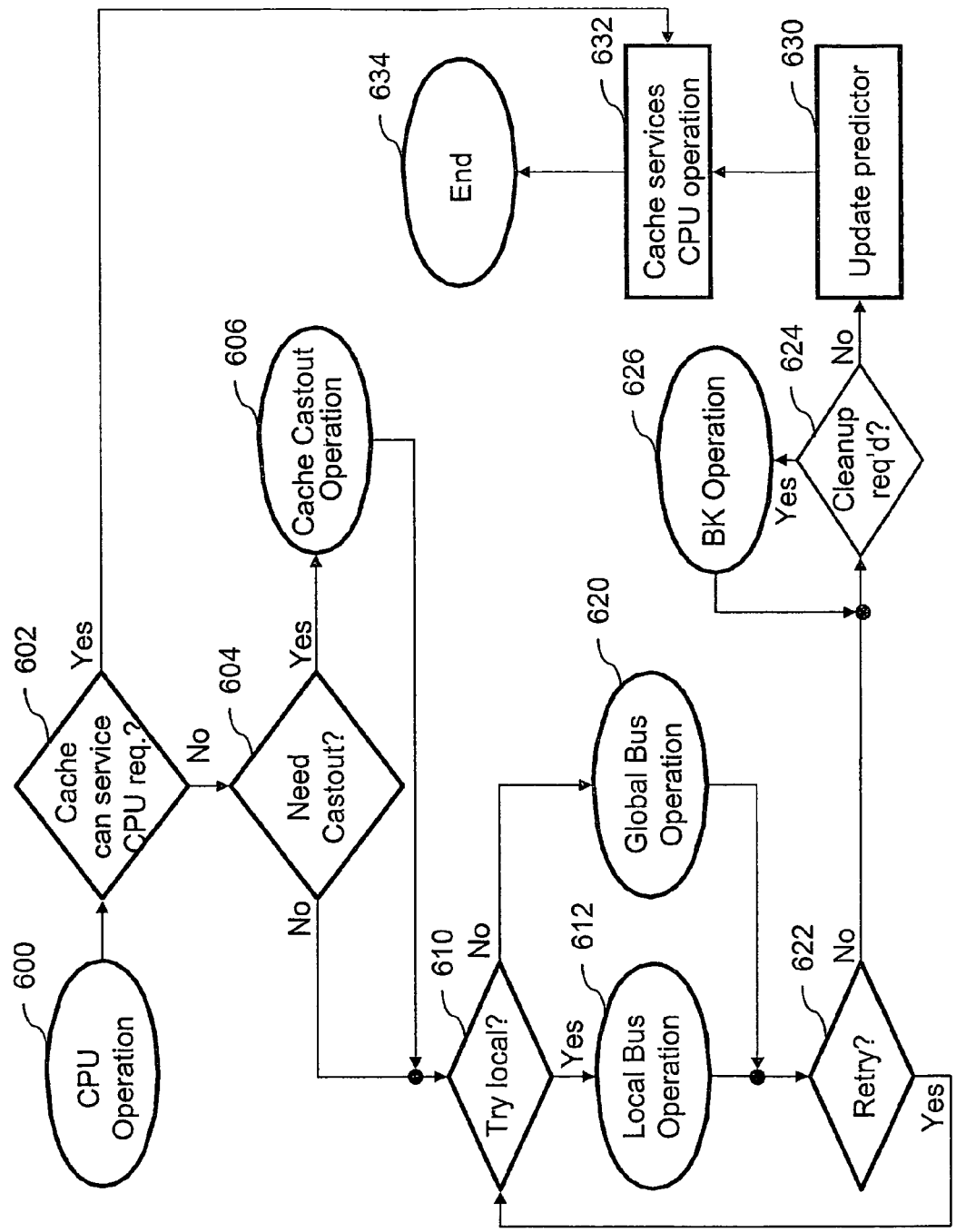
FIG. 6 is a high level logical flowchart of an exemplary method by which a cache memory services an operation received a processor core in a data processing system in accordance with the present invention.

With reference first to FIG. 6, there is depicted a high level logical flowchart of an exemplary method of servicing a processor (CPU) exclusive access (or storage modifying) request in a data processing system in accordance with the present invention. As with the other logical flowcharts presented herein, at least some of the steps depicted in FIG. 6 may be performed in a different order than is shown or may be performed concurrently.

The process of FIG. 6 begins at block 600, which represents a master 232 in an L2 cache 230 receiving a CPU exclusive access request (e.g., a CPU data store request or a CPU kill request, etc.) from an associated processor core 200 in its processing unit 104. In response to receipt of the CPU request, master 232 determines at block 602 whether or not the target memory block, which is identified within the CPU exclusive access request by a target address, is held in L2 cache directory 302 in a coherency state that permits the CPU exclusive access request to be serviced without issuing a bus operation on the interconnect fabric. For example, a CPU data store request can be serviced without issuing a bus operation on the interconnect fabric if L2 cache directory 302 indicates that the coherency state of the target memory block is one of the M or Me states. If master 232 determines at block 602 that the CPU exclusive access request can be serviced without issuing a bus operation on the interconnect fabric, master 232 accesses L2 cache array 300 if needed to service the CPU request, as shown at block 632. For example, master 232 may store data provided in a CPU data store request into L2 cache array 300. Following block 632, the process terminates at block 634.

Returning to block 602, if the target memory block is not held in L2 directory 302 in a coherency state that permits the CPU exclusive access request to be serviced without issuing a bus operation on the interconnect fabric, a determination is also made at block 604 whether or not a castout of an existing cache line is required to accommodate the target memory block in L2 cache 230. In one embodiment, a castout operation is required at block 604 if a memory block is selected for eviction from the L2 cache 230 of the requesting processor in response to the CPU exclusive access request and is marked in L2 directory 302 as being in any of the M, T, Te, Tn or Ig coherency states. In response to a determination at block 604 that a castout is required, a cache castout operation is performed, as indicated at block 606. Concurrently, the master 232 determines at block 610 a scope of a bus operation to be issued to service the CPU exclusive access request. For example, in one embodiment, master 232 determines at block 610 whether to broadcast a bus operation as a local operation restricted in scope to a single processing node 102 or a global operation encompassing all processing nodes 102 in data processing system 100.

In a first embodiment in which each bus operation is initially issued as a local operation and issued as a local operation only once, the determination depicted at block 610 can simply represent a determination by the master of whether or not the bus operation has previously been issued as a local bus operation. In a second alternative embodiment in which local bus operations can be retried with a local scope, the determination depicted at block 610 can represent a determination by the master of whether or not the bus operation has previously been issued more than a threshold number of times. In a third alternative embodiment, the determination made at block 610 can be based upon a prediction by the master 232 of whether or not a local bus operation is likely to be successful in resolving the coherency of the target memory block without communication with processing nodes in other coherency domains. For example, master 232 may select a local bus operation if the associated L2 cache directory 302 associates the target address with the In coherency state and may select a global bus operation if the associated L2 cache directory 302 associates the target address with the Ig or Igp coherency state. If an operation has been issued unsuccessfully (i.e., received a Retry combined response), the determination depicted at block 610 may further take into consideration information gained from the combined response of the unsuccessful operation, for example, indications of the presence of cache line in the Ig or Igp coherency state in the local coherency domain.

In response to a determination at block 610, master 232 issues either a local bus exclusive access operation broadcast only within the local coherency domain (e.g., processing node 102) containing master 232 (block 612) or a global bus exclusive access operation broadcast in all coherency domains in data processing system 100 (block 620). The exclusive access operation includes at least a transaction type (Ttype) identifying the type of exclusive access operation (RWITM, DClaim, DCBZ, Kill, Write or Partial Write) and a target address identifying the target memory block. Master 232 then awaits receipt of the combined response of the operation, as shown at blocks 622 and 624.

For purposes of the present description, the combined response can be any of at least three general types: Success, Success with cleanup, and Retry. If the combined response indicates Retry, master 232 failed to gain coherency ownership of the target memory block by the exclusive access operation issued at block 612 or 620, and the operation must be reissued (possibly with an expanded broadcast scope). Consequently, the process returns from block 622 to block 610, which has been described. If master 232 does not receive a CR indicating Retry, but instead receives a CR indicating Success with cleanup, master 232 has been awarded coherency ownership of the target memory block and must invalidate any remaining cached copies of the target memory block held in other cache memories 230. To do so, master 232 initiates a background kill (BK) operation of a selected scope (e.g., local or global), as shown at block 626. In at least some embodiments, master 232 may select the scope based upon information contained in the CR of the exclusive access operation. Following block 626, the CR of the background kill operation is tested at block 624. In response to a determination at block 624 that the CR of an exclusive access operation or of a background kill operation indicates Success, master 232 has successfully gained exclusive access to the target memory block. Master 232 thereafter updates the predictor (e.g., coherency state or history-based predictor) utilized to make the scope selection depicted at block 630. In addition, master 232 services the CPU request, as shown at block 632. Thereafter, the process ends at block 634.

Thus, assuming affinity between processes and their data within the same coherency domain, CPU requests can frequently be serviced utilizing broadcast communication limited in scope to the coherency domain of the requesting master or of other restricted scope less than a full global scope. The combination of data delivery domains as hereinbefore described and coherency domains thus improves not only data access latency, but also reduces traffic on the system interconnect (and other local interconnects) by limiting the scope of broadcast communication.

Figure 7A:
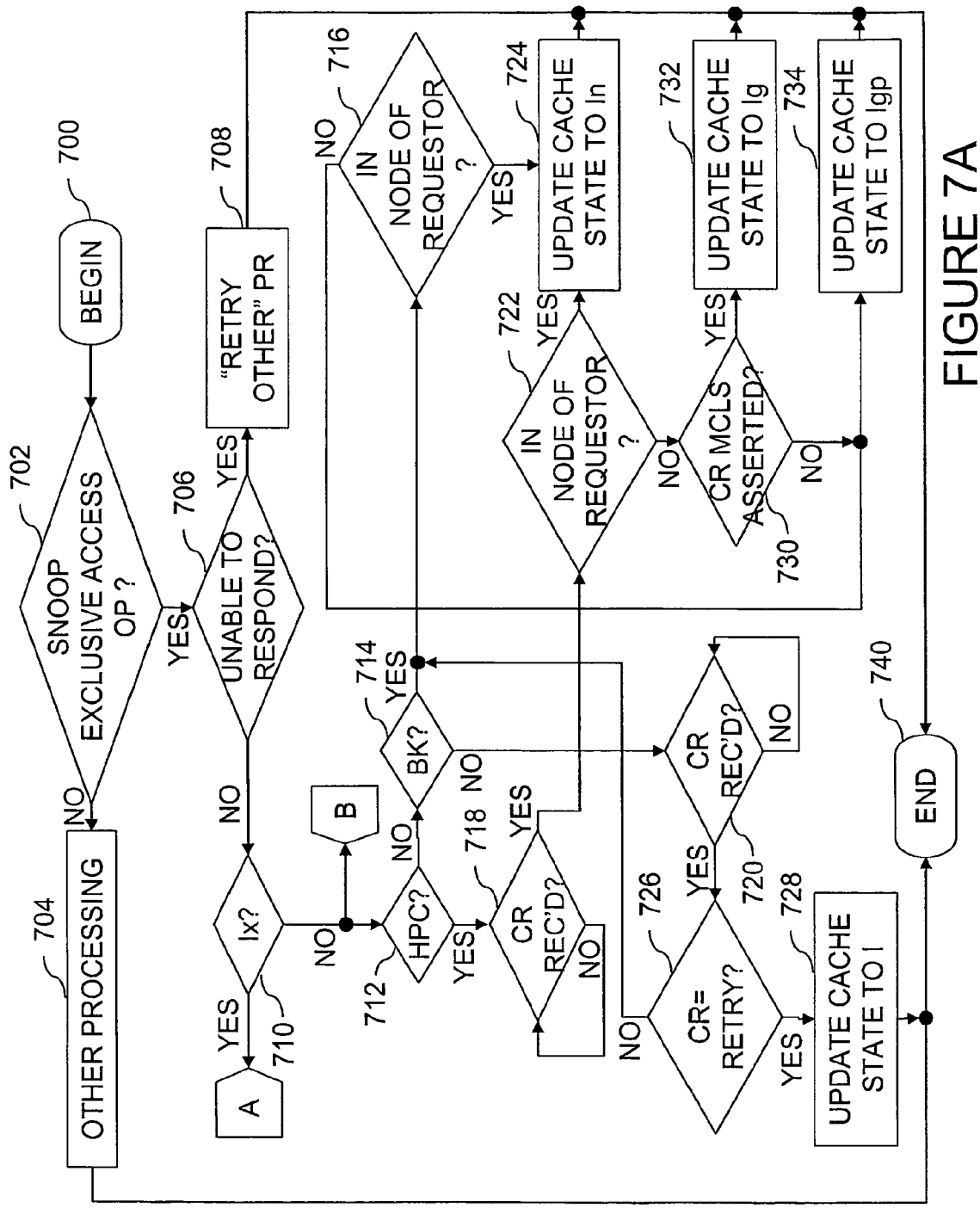
FIG. 7A-7C together form a high level logical flowchart of an exemplary method by which a cache processes a snooped storage modifying operation in accordance with the present invention.
Figure 7B:
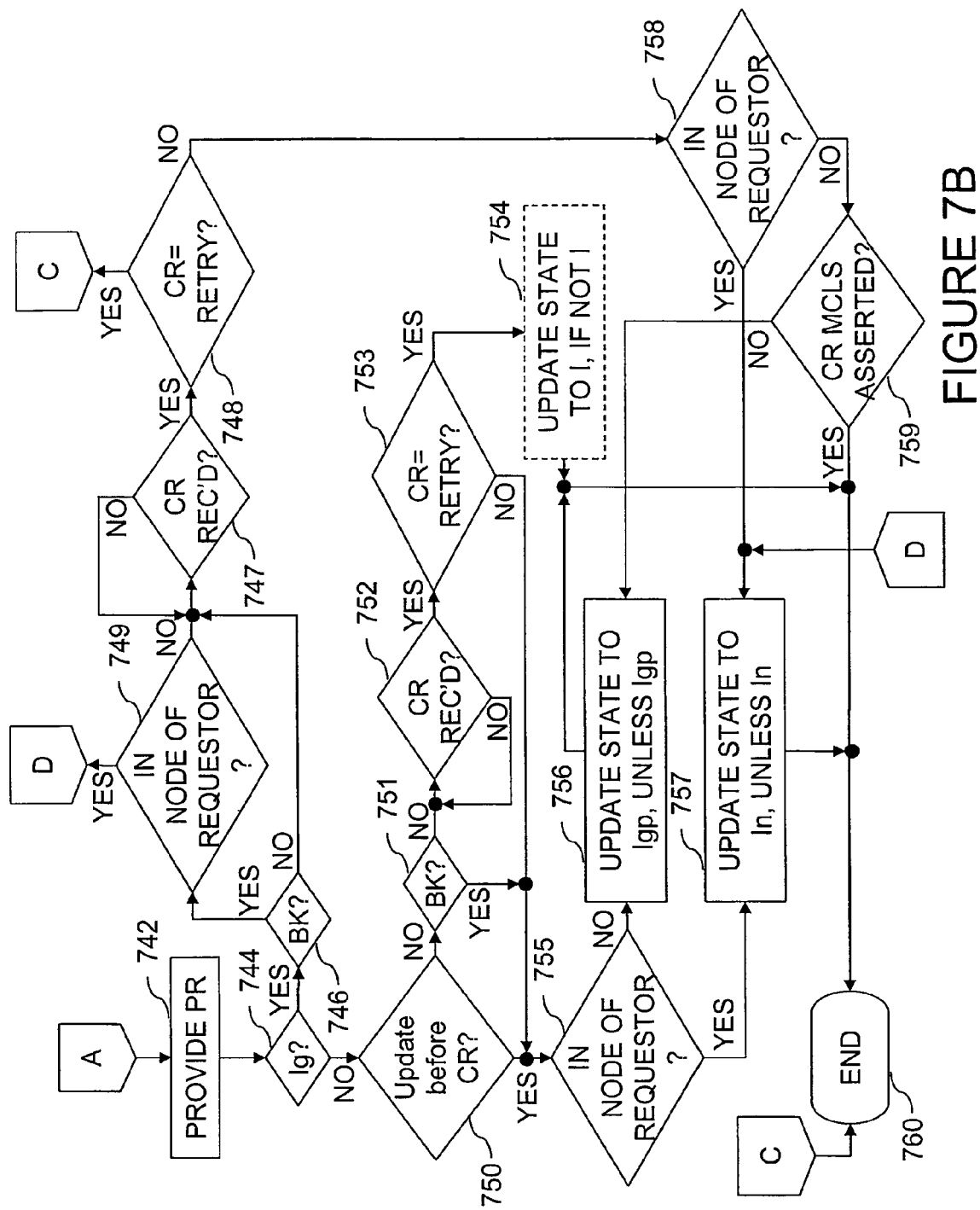
Figure 7C:
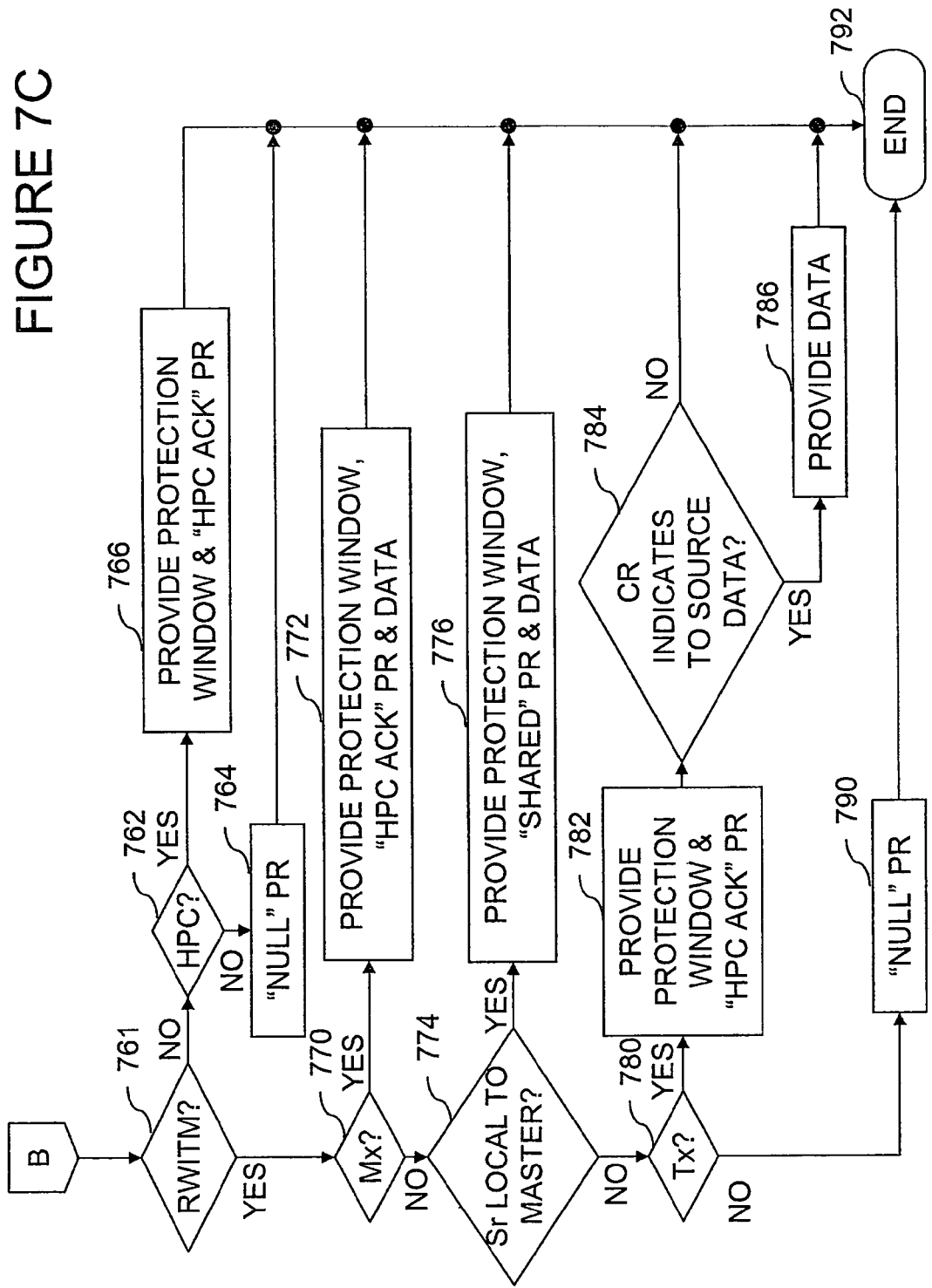

With reference now to FIGS. 7A-7C, there is depicted a high level logical flowchart of an exemplary method by which a cache snooper, such as an L2 cache snooper 236, processes a exclusive access operation (also referred to as a storage-modifying operation) in accordance with the present invention. Exclusive access requests include the RWITM, DClaim, DCBZ, Kill, Write and Partial Write operations described above.

As shown, the process begins at block 700 of FIG. 7A in response to receipt by an L2 cache snooper 236 of a request on its local interconnect 114. In response to receipt of the request, snooper 236 determines at block 702 whether or not the request is an exclusive access operation, for example, by reference to a transaction type (Ttype) field within the request. If not, snooper 236 performs other processing, as shown at block 704, and the process ends at block 740. If, however, snooper 236 determines at block 702 that the request is an exclusive access operation, snooper 236 further determines at block 706 whether or not it is presently able to substantively respond to the exclusive access operation (e.g., whether it has an available instance of snoop logic and current access to its L2 cache directory 302). If snooper 236 is presently unable to substantively respond to the domain query request, snooper 236 provides a partial response (PR) indicating "Retry_other", as depicted at block 708, and processing of the exclusive access operation ends at block 740.

Assuming that snooper 236 is able to substantively respond to the exclusive access operation, snooper 236 determines at block 710 whether or not the associated L2 cache directory 302 indicates a tag valid, data-invalid coherency state (e.g., In, Ig, Igp, I) for the memory block containing the target address. If so, the process passes through page connector A to FIG. 7B, which is described in detail below. If, however, the associated L2 cache directory 302 indicates a data-valid coherency state (Mx, Tx, or Sx), the process bifurcates and proceeds in parallel to block 712 and following blocks, which represent the coherency state update performed by snooper 236, and via page connector B to FIG. 7C, which depicts the data delivery and protection activities, if any, of snooper 236.

Referring first to block 712, snooper 236 determines by reference to the coherency state read from its L2 cache directory 302 whether or not it is located at the HPC for the target memory block identified by the target address of the snooped request. If not, snooper 236 optionally determines at block 714 whether or not the Ttype of the snooped request indicates that the snooped request is a background kill request. If not, the process passes to block 720, which is described below.

In response to a positive determination at block 714, the snooper is permitted to (but is not required to) update the coherency state of the target address in its L2 cache directory 302 prior to receipt of the combined response based upon whether or not snooper 236 resides within the same coherency domain as the device (e.g., L2 cache 230) that originally issued background kill request (block 716). For example, snooper 236 may make the determination illustrated at block 716 by examining the range bit contained in the background kill request. If snooper 236 determines at block 716 that it is within the same coherency domain as the device that initiated the background kill request, snooper 236 updates the coherency state for the target address of the background kill request to the In coherency state in its L2 cache directory 302 (block 724). As noted above, the In coherency state provides an imprecise indication that the HPC for the memory block resides in the local (not necessarily home) coherency domain and that a subsequent local operation requesting the memory block may be successful. If, on the other hand, snooper 236 determines at block 716 that it is not within the same coherency domain as the device that initiated the background kill request, the process passes to block 734. Block 734 depicts snooper 236 updating the coherency state of the target address to Igp in its L2 cache directory 302. As noted above, the Igp coherency state provides an imprecise indication that the HPC for the target memory block resides in a remote coherency domain and that a subsequent operation requesting the target memory block should be global. Following either block 724 or block 734, the process ends at block 740.

Referring now to block 720, if a negative determination is made at optional block 714 or if the determination shown at block 714 is not performed, snooper 236 awaits receipt of the combined response for the exclusive access request. In response to receipt of the combined response at block 720, snooper 236 determines at block 726 whether or not the combined response for the exclusive access request indicates Retry. If not, the exclusive access request succeeded with a Success or Success with cleanup CR, and the process passes to block 716, which has been described. If, however, the combined response for the exclusive access request indicates Retry (i.e., the exclusive access request did not succeed), snooper 236 simply updates the coherency state of the target address to I in its L2 cache directory 302, as depicted at block 728. The I coherency state is employed instead of the Ig, Igp or In states because the relative location of the HPC for the target address to snooper 236 is not indicated by the combined response for the unsuccessful exclusive access operation. Following block 728, the process terminates at block 740.

Returning to block 712, in response to snooper 236 determining that it is located at the HPC for the target address, snooper 236 awaits receipt of the combined response for the exclusive access request, as depicted at block 718. In response to receipt by snooper 236 of the combined response, the process proceeds to block 722. Block 722 illustrates snooper 236 determining whether or it resides within the same coherency domain as the device (e.g., L2 cache 230) that originally issued the exclusive access request. As noted above, snooper 236 may make the determination illustrated at block 722 by examining the range bit contained in the exclusive access request. If snooper 236 determines at block 722 that it is within the same coherency domain as the device that initiated the exclusive access request, snooper 236 updates the coherency state for the target address to the In coherency state in its L2 cache directory 302 (block 724). As noted above, the In coherency state provides an imprecise indication that the HPC for the memory block resides in the local (not necessarily home) coherency domain and that a subsequent local operation requesting the memory block may be successful. If, on the other hand, snooper 236 determines at block 722 that it is not within the same coherency domain as the device that initiated the exclusive access request, snooper 236 updates the coherency state of the target address in its L2 cache directory 302 based upon whether or not snooper 236 resides in the same coherency domain as the home system memory 108 of the target address (block 730). In one preferred embodiment, the determination depicted at block 730 is made based upon the state of a Memory Controller Local to Snooper (MCLS) field within the CR. The state of the MCLS field of the CR may be set in accordance with the method depicted in FIG. 10 and described below.

In response to a determination at block 730 that the MCLS field of the CR is not asserted, meaning that snooper 236 does not reside in the same coherency domain as the home system memory 108 of the target address, snooper 236 updates the coherency state of the target address to Igp in its L2 cache directory 302 (block 734). Otherwise, snooper 236 updates the coherency state for the target address to Ig (block 732). The Igp and Ig coherency states both provide an imprecise indication that the HPC for the target memory block resides in a remote coherency domain and that a subsequent operation requesting the target memory block should be global. The Igp coherency state, however, is not subject to subsequent castout to system memory 108, but is simply deallocated. Following either block 732 or block 734, the process ends at block 740.

With reference now to FIG. 7B, the response of a snooper 236 to an exclusive access request having a target address for which the snooper 236 has a data-invalid coherency state (e.g., In, Ig, Igp, or I) in its L2 cache directory 302 is depicted. The process proceeds from FIG. 7A via page connector A and then proceeds to block 742, which depicts snooper 236 providing an appropriate partial response to the exclusive access request. In some embodiments, the partial response provided at block 742 can be Null for all Ix coherency states except Ig in order to indicate that the L2 cache 230 containing snooper 236 does not hold a data-valid copy of the target memory block. For the Ig coherency state, the partial response is a form of Retry indicating that the HPC for the target address likely resides outside of the coherency domain containing snooper 236. In other embodiments, the partial response generated at block 742 for non-Ig coherency states can additionally provide a scope hint reflecting the scope information indicated by the local coherency state (Igp or In). Following block 742 the process bifurcates at block 744 and proceeds to block 746 if the local coherency state for the target address is Ig and otherwise proceeds to block 750.

At block 746, snooper 236 optionally determines whether or not the Ttype of the snooped request indicates that the snooped request is a background kill request. If not (or if the optional determination is not made), the process passes to block 747, which is described below. If a determination is made at optional block 746 that the snooped request is a background kill request, a further determination is made at block 749 whether or not snooper 236 resides within the same coherency domain as the device (e.g., L2 cache 230) that originally issued the background kill request (block 749). For example, snooper 236 may make the determination illustrated at block 749 by examining the range bit contained in the background kill request. If snooper 236 determines at block 749 that it is within the same coherency domain as the device that initiated the background kill request, the process passes through page connector D to block 757, which depicts snooper 236 updating the coherency state for the target address of the background kill request to the In coherency state in its L2 cache directory 302. As noted above, the In coherency state provides an imprecise indication that the HPC for the memory block resides in the local (not necessarily home) coherency domain and that a subsequent local operation requesting the memory block may be successful. The process then terminates at block 760. If, on the other hand, snooper 236 determines at block 749 that it is not within the same coherency domain as the device that initiated the background kill request, the process passes to block 747.

Block 747 depicts snooper 236 awaiting receipt of the combined response for the snooped request. In response to receipt of the combined response for the snooped request, a determination is made at block 748 whether or not the combined response indicates Retry. If so, the snooped operation did not succeed, and snooper 236 does not update its coherency state for the target address. Consequently, the process passes through page connector C and ends at block 760. If, however, the combined response for the snooped request does not indicate Retry, snooper 236 determines at block 758 by reference to the range bit contained in the snooped request whether or not it is within the same coherency domain (e.g., processing node 102) as the master 232 that issued the snooped request. If so, snooper 236 updates the coherency state for the target address of the background kill request to the In coherency state in its L2 cache directory 302 (block 757). Thereafter, the process ends at block 760.

Returning to block 758, in response to a determination by snooper 236 that it is not within the same coherency domain as the master 232 that issued the snooped request, snooper 236 determines whether or not it resides in the same coherency domain as the home system memory 108 of the target address (block 759). In one preferred embodiment, the determination depicted at block 759 is made based upon the state of a Memory Controller Local to Snooper (MCLS) field within the CR. If snooper 236 determines at block 759 that it is within the same coherency domain as the home system memory 108 of the target address, snooper 236 makes no update to the Ig coherency state in its L2 cache directory 302, and the process terminates at block 760. No coherency state update is made in this case because the Ig coherency state may be required to update the state of the associated domain indicator 504 in system memory 108. If, however, snooper 236 makes a negative determination at block 759, snooper 236 updates the coherency state for the target address of the background kill request to the Igp coherency state in its L2 cache directory 302 (block 756). If the coherency state is already Igp, the coherency state update may or may not be performed anyway, depending upon the complexity of the implementation of snooper 236. As noted above, the Igp coherency state provides an imprecise indication that the HPC for the target memory block resides in a remote coherency domain and that a subsequent operation requesting the target memory block should be global. Following block 756, the process ends at block 760.

With reference now to block 750, if the local coherency state for the target address of the snooped request is not Ig, snooper 236 can optionally update the Ix coherency state of the target address in its L2 cache directory 302 without reference to the CR of the snooped request in order to reduce the tenure for which snooper 236 is allocated to the snooped request. Alternatively, snooper 236 can update the Ix coherency state of the target address in its L2 cache directory 302 in response to the CR. Waiting for the CR to perform the update represents a performance tradeoff of tenure duration for improved accuracy in that snooper 236 is uncertain of whether the master 232 of the snooped request succeeded in obtaining coherency ownership of the target address before the CR is received. If snooper 236 is implemented to update the Ix coherency state without reference to the CR, the process passes directly to block 755, which is described below. If, however, snooper 236 is implemented such that it updates the Ix coherency state by reference to the CR for the snooped request, the process proceeds to block 751, which represents snooper 236 making an optional determination by reference to the Ttype of the snooped request whether or not the snooped request is a background kill request. If so, the process proceeds to block 755, which is described below. If snooper 236 determines at block 751 that the snooped request is not a background kill request, snooper 236 awaits receipt of the CR for the snooped request at block 752.

In response to receipt of the combined response, snooper 236 determines at block 753 whether or not the combined response for the exclusive access request indicates Retry. If not, the exclusive access request succeeded with a Success or Success with cleanup CR, and the process passes to block 755. If, however, the combined response for the exclusive access request indicates Retry (i.e., the exclusive access request did not succeed), snooper 236 simply optionally updates the coherency state of the target address to I in its L2 cache directory 302, as depicted at block 754. The I coherency state is employed instead of the Ig, Igp or In states because the relative location of the HPC for the target address to snooper 236 is not indicated by the unsuccessful exclusive access operation. Following a positive determination at block 753 or optional block 754, the process terminates at block 760.

Referring now to block 755, snooper 236 updates the Ix coherency state of the target address in its L2 cache directory 302 based upon whether or not snooper 236 resides within the same coherency domain as the device (e.g., L2 cache 230) that originally issued the snooped request. For example, snooper 236 may make the determination illustrated at block 755 by examining the range bit contained in the snooped request. If snooper 236 determines at block 755 that it is within the same coherency domain as the device that initiated the snooped request, snooper 236 updates the coherency state for the target address of the snooped request to the In coherency state in its L2 cache directory 302 (block 757). If, on the other hand, snooper 236 determines at block 755 that it is not within the same coherency domain as the device that initiated the snooped request, snooper 236 updates the coherency state of the target address to Igp in its L2 cache directory 302 (block 756). If the coherency state is already In at block 757 or if the coherency state is already Igp at block 756, the update may or may not be performed anyway, depending upon the complexity of the implementation of snooper 236. Following either block 756 or block 757, the process ends at block 760.

Referring now to FIG. 7C, the data delivery and protection activities, if any, of a snooper 236 of an L2 cache 230 holding a data-valid cached copy of a target memory block are depicted. As illustrated, snooper 236 determines at block 761 whether or not the snooped exclusive access operation is a RWITM operation, for example, by examining the Ttype specified by the snooped request. As indicated in Table I above, a RWITM operation is an exclusive access operation in which the initiator requests from another participant a unique copy of the image of a memory block with the intent to update (modify) it. If a determination is made at block 761 that the exclusive access operation is a RWITM operation, the process passes to block 770, which is described below. If not, the process proceeds to block 762, which depicts snooper 236 determining whether or not it is located at the HPC for the target memory block, for example, by reference to the coherency state of the target memory block in the associated L2 cache directory 302. In response to a determination at block 762 that snooper 236 is not located at the HPC for the target memory block of the exclusive access operation, snooper 236 generates or causes to be generated a "Null" partial response (block 764). However, in response to a determination at block 762 that the snooper 236 resides at the HPC, snooper 236 provides (or causes to be provided) an "HPC_ack" partial response acknowledging that the initiator of the exclusive access operation has been selected as the new HPC for the target memory block and extends a protection window 404a to prevent other requestors from gaining coherency ownership of the memory block (block 766).

Referring now to block 770 and following blocks, snooper 236 responds to a RWITM operation based upon the coherency state of the target memory block in its associated L2 cache directory 302. In particular, if the coherency state of the target memory block in L2 cache directory 302 is Mx (e.g., M or Me), extends a protection window 404a to prevent other requestors from gaining ownership of the target memory block, provides an "HPC_ack" partial response, and sources a copy of the memory block to the requester, as shown at blocks 770 and 772.

If, in the alternative, the coherency state of the target memory block in L2 cache directory 302 is Sr and snooper 236 is within the same data sourcing domain (e.g., processing node 102) as the requester, snooper 236 extends a protection window 404a, provides a "Shared" partial response, and sources a copy of the memory block to the requester, as shown at blocks 774 and 776. In the alternative, if the coherency state of the target memory block in L2 cache directory 302 is Tx (e.g., T, Te, Tn or Ten) as shown at block 780, snooper 236 extends a protection window 404a to prevent other requestors from gaining ownership of the target memory block and provides an "HPC_ack" partial response, as shown at block 782. In addition, as indicated at blocks 784 and 786, snooper 236 may source a copy of the target memory block to the requester, depending upon the combined response received from response logic 210. That is, if the combined response indicates that this snooper 236 is responsible for sourcing a copy of the target memory block (e.g., no snooper 236 in the same coherency domain as the requester holds the target memory block in the Sr state), snooper 236 transmits a copy of the target memory block to the requester, as shown at block 786.

Referring again to block 780, in response to a negative determination snooper 236 simply provides a "Null" partial response, as shown at block 790. Following any of blocks 766, 764, 772, 776, 784, 786 and 790, the process ends at block 792.

It will be appreciated by reference to the above-referenced patent applications that for exclusive access requests of local scope, an IMC 206 may or may not be able to source a requested memory block to the requesting master 232 in every case in which the CR indicates that the IMC 206 has the responsibility for doing so. Consequently, in some implementations, the determinations of whether the CR indicates Retry illustrated at blocks 726, 748 and 753 may further pessimistically deem a CR indicating that an IMC 206 is responsible for sourcing a target memory block as a Retry CR for purposes of updating the coherency states of the target address at bystander snooping L2 cache memories 230.

Figure 8:
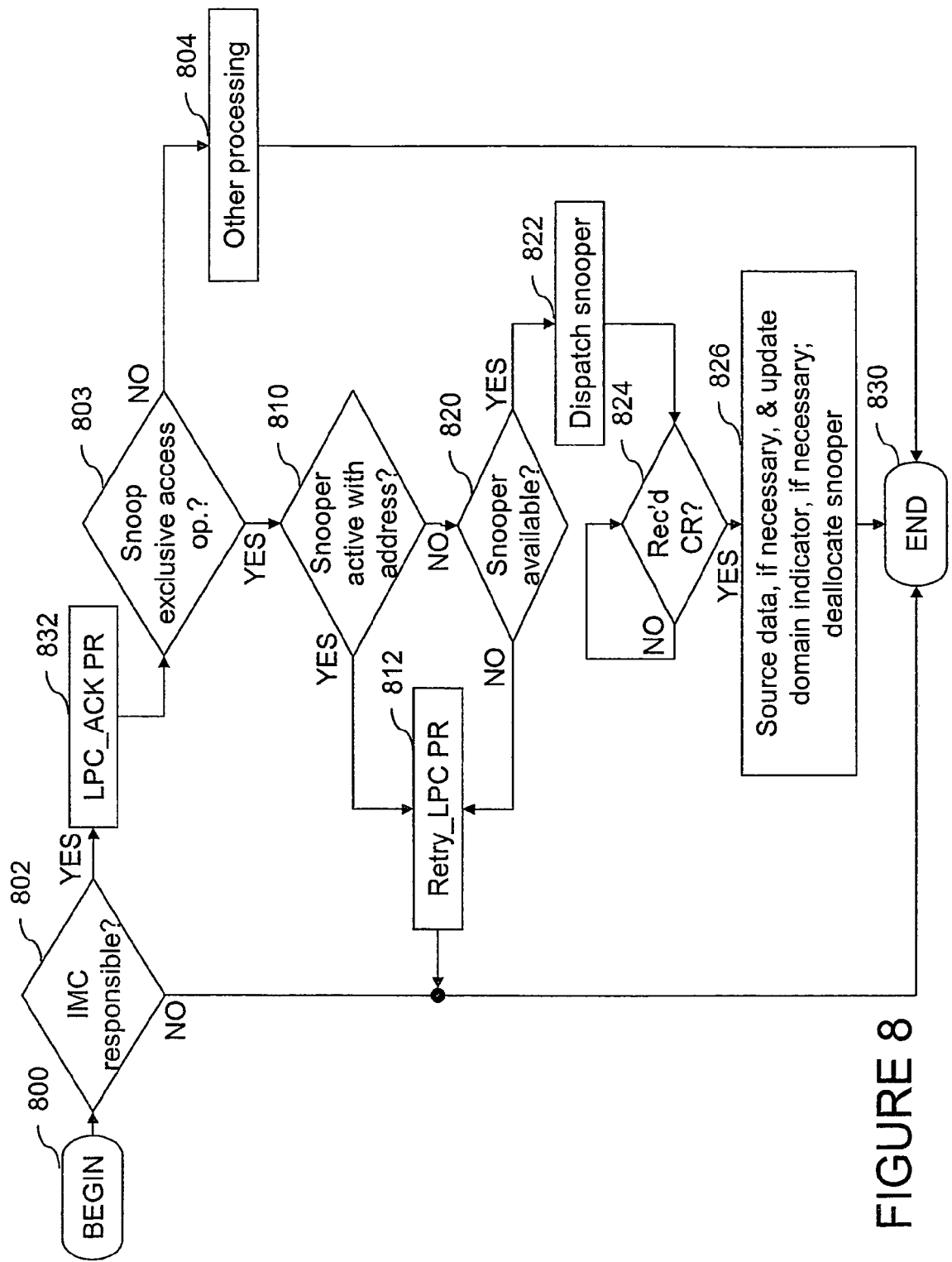
FIG. 8 is a high level logical flowchart of an exemplary method by which a memory controller processes a snooped storage modifying operation in accordance with the present invention.

With reference now to FIG. 8, there is illustrated a high level logical flowchart of an exemplary process by which an IMC 18 responds to a snooped request in accordance with the present invention. As depicted, the process begins at block 800 and thereafter proceeds to block 802, which illustrates IMC 18 determining by reference to BAR logic 240 whether or not it is responsible for the target address specified within the snooped request. If not, IMC 18 does not allocate a snooper 222 to the snooped request, and the process simply terminates at block 830. If, on the other hand, IMC 18 determines at block 802 that it is responsible for the target address, IMC 18 generates an LPC_Ack partial response at block 832. Next, IMC 18 determines at block 803 by reference to the Ttype of the snooped request if the request is an exclusive access request. If not, IMC performs other processing, as shown at block 804. Thereafter, the process ends at block 830.

Returning to block 803, in response to a determination that the snooped request is an exclusive access request, IMC 18 further determines at blocks 810 and 820 whether one of its snoopers 222 is active with the target address of the snooped request and if one of snoopers 222 is available for dispatch. If IMC 18 determines at block 810 that one of its snoopers 222 is already active with the target address of the snooped request or determines at block 820 that it does not have a snooper 222 available for dispatch, the process proceeds to block 812, which illustrates IMC 18 transmitting a Retry_LPC partial response to the snooped request. Thereafter, the process ends at block 830.

If IMC 18 determines at block 810 that none of its snoopers 222 is active with the target address of the snooped request and determines at block 820 that it has a snooper 222 available for dispatch, the process proceeds to blocks 822 and 824, which illustrates IMC 18 dispatching a snooper 222 to await receipt of the combined response to the snooped request. In response to receipt of the combined response, the dispatched snooper 222 sources requested data from system memory 108, if necessary, and, if necessary, updates the domain indicator 504 in system memory 108 (block 826). Thereafter, the snooper is deallocated, and the process ends at block 830.

Figure 9:
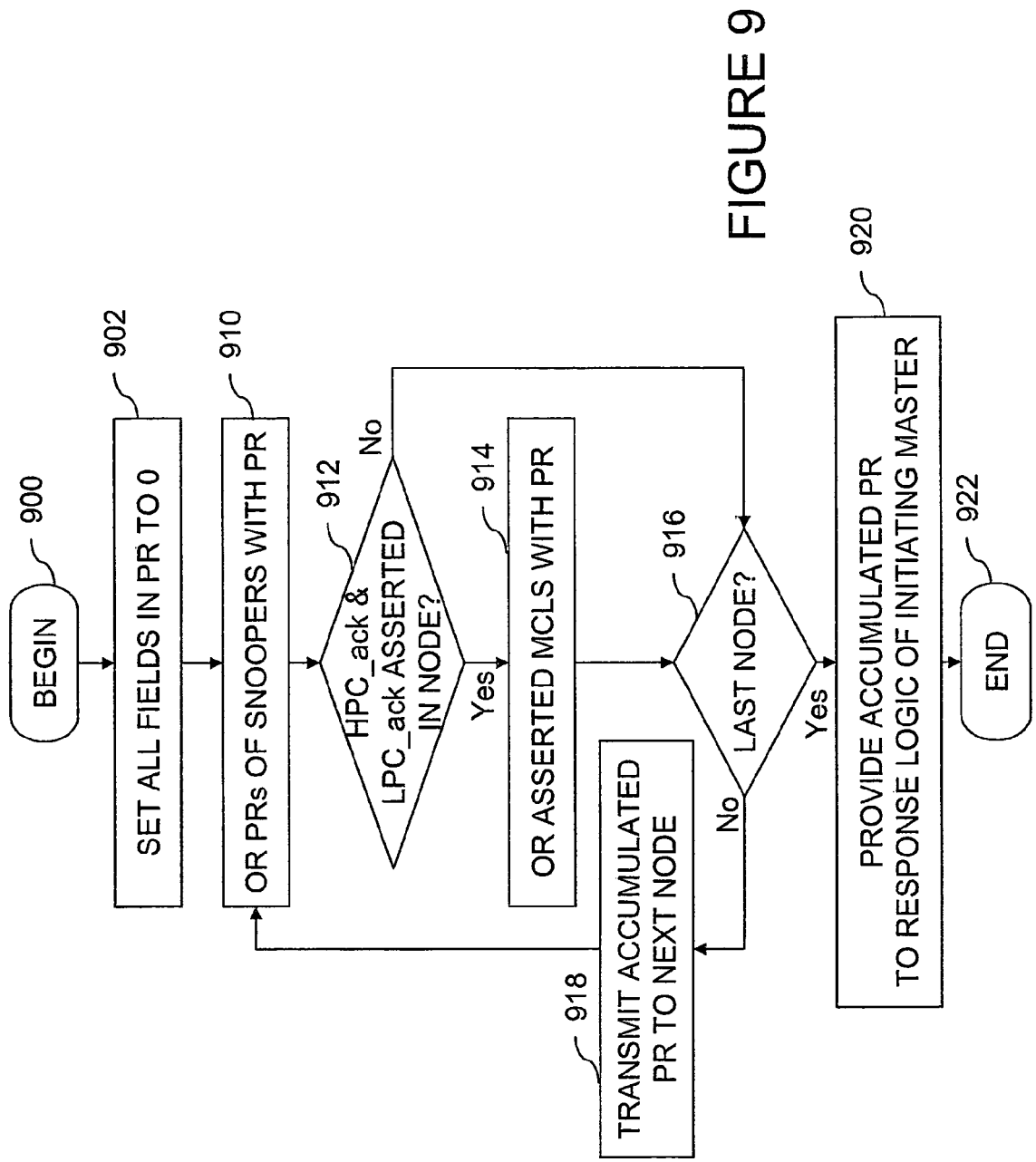
FIG. 9 is a high level logical flowchart of an exemplary process by which partial responses are accumulated in stages in accordance with one embodiment of the present invention.

Referring now to FIG. 9, there is depicted a high level logical flowchart of an exemplary method by which partial responses of an exclusive access operation are generated and accumulated in accordance with the present invention. In the depicted embodiment, partial responses are accumulated node-by-node sequentially or in parallel until a single complete partial response is obtained.

As indicated, the process begins at block 900 and then proceeds to block 902, which illustrates a processing unit 104 within a first processing node 102 initializing all bit fields within the partial response to 0. Next, at block 910 each snooper 222, 236 in the processing node 104 performs a logical OR of its individual partial response with the accumulated partial response. Response logic 210 within the processing node 102 then determines at block 912 whether an HPC_ack partial response and an LPC_ack partial response were asserted by an L2 cache snooper 236 and a memory controller snooper 222, respectively, within the current processing node 102. If so, the former HPC of the target memory block and the home system memory 108 of the target memory block are both present in this processing node 102. Accordingly, response logic 210 performs a logical OR operation of an asserted MCLS bit with a corresponding MCLS bit within the accumulated partial response, as depicted at block 914.

Next, at block 916, response logic 210 of the current processing node 102 determines whether or not the current processing node 102 is the last processing node 102 for which the partial response is to be accumulated (e.g., the processing node 102 containing the master 232 that initiated the exclusive access request). If not, response logic 210 transmits the accumulated partial response to a next processing node 102 for processing, as depicted at block 918. Thereafter, the partial response is accumulated in that next processing node 102, as depicted at block 910 and following blocks. If, on the other hand, response logic 210 determines that the present processing node 102 is the last processing node 102 for which partial responses are to be accumulated, the process passes to block 920, which depicts providing the accumulated partial response to the response logic 210 of the processing unit 104 containing the master 232 that initiated the exclusive access operation. Thereafter, the process depicted in FIG. 9 terminates at block 922.

Figure 10:
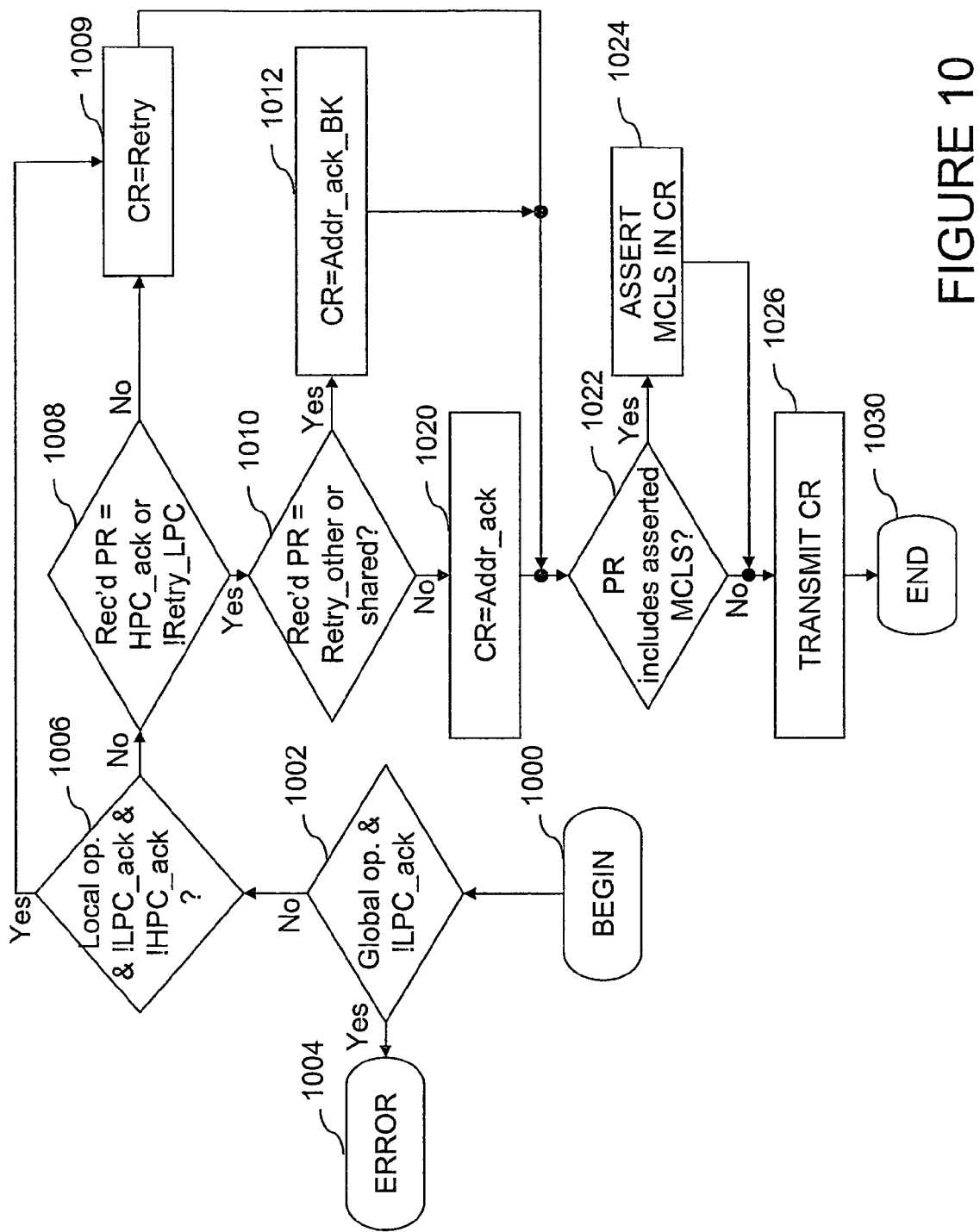
FIG. 10 is a high level logical flowchart of an exemplary process by which a combined response for a storage modifying operation is generated in accordance with one embodiment of the present invention.

With reference now to FIG. 10, there is illustrated a high level logical flowchart of an exemplary method by which response logic 210 generates a combined response for an exclusive access operation in the presence of Ix L2 cache snoopers 236 in accordance with the present invention. (Further detail regarding the generation of the combined response for other coherency states may be found in the above-referenced co-pending applications.) In one preferred embodiment, the response logic 210 that generates the combined response for the exclusive access operation is the response logic 210 of the processing unit 104 containing the master 232 that issued the exclusive access operation.

As depicted, the process begins at block 1000 in response to receipt of the accumulated partial response and thereafter proceeds to block 1002, which depicts a determination of whether or not the exclusive access operation is a global operation and whether or not the accumulated partial response includes an LPC_ack partial response from a memory controller 206. If response logic 210 determines at block 1002 that the exclusive access operation is a global operation and the accumulated partial response did not include an LPC_ack partial response, processing stops at block 1004 with an error condition because no LPC for the target address was located.

If, on the other hand, response logic 210 makes a negative determination at block 1002, response logic 210 determines at block 1006 whether the exclusive access operation has a local scope and the accumulated partial response indicates that no LPC_ack partial response or no HPC_ack partial response was received. An affirmative determination at block 1006 indicates that the scope of the exclusive access request should be increased because the LPC for the target address is not within the local coherency domain and the HPC is likely not within the local coherency domain. Accordingly, in response to an affirmative determination at block 1006, the process passes to block 1009, which depicts response logic 210 generating a combined response indicating Retry (and optionally further indicating that the request should be reissued with increased scope). As discussed above with reference to blocks 622 and 610 of FIG. 6, a Retry CR generated in response to an affirmative determination at block 1001 or block 1002 of FIG. 10 causes the master 232 to reissue the exclusive access request, perhaps with a increased broadcast scope. The process then passes to block 1022, which is described below.

Referring again to block 1006, in response to a negative determination, the process passes to block 1008. Block 1008 illustrates response logic 210 determining whether or not the accumulated partial response includes an HPC_ack partial response from an L2 cache snooper 236 or does not include a Retry_LPC partial response from an IMC 206. In response to a negative determination at block 1008, the process passes to block 1009, which depicts response logic 210 generating a combined response indicating Retry. The process then passes to block 1022.

Returning to block 1008, if response logic 210 makes an affirmative determination, the process proceeds from block 1008 to block 1010, which illustrates response logic 210 determining whether or not the accumulated partial response indicates the presence of a Retry_other or Shared partial response. If so, the initiating master 232 can be granted coherency ownership of the target memory block of the exclusive access request, but at least one non-HPC L2 cache memory 230 may retain a cached data-valid copy of the target memory block. Consequently, response logic 210 generates a Success with cleanup combined response, such as Addr_ack_BK. As discussed above, a Success with cleanup CR will cause the initiating master 232 to issue a background kill request, as depicted at block 626 of FIG. 6. Thereafter, the process passes to block 1022, which is described below.

With reference again to block 1010, in response to a determination by response logic 210 that the accumulated partial response does not indicate that a Retry_other or Shared partial response was received, the process passes to block 1020, which depicts response logic 210 generating a combined response indicating Success, such as an Addr_ack combined response. The process then proceeds to block 1022, which depicts response logic 210 determining whether or not the MCLS field is asserted within the accumulated partial response, as described above with reference to blocks 912 and 914 of FIG. 9. If not, the process proceeds directly to block 1026. If, on the other hand, an affirmative determination is made at block 1022, response logic 210 asserts the MCLS field within the combined response at block 1024. The process then passes to block 1026.

Block 1026 depicts response logic 210 transmitting the combined response with a broadcast scope matching that of the original exclusive access request (block 1026). Thereafter, the process terminates at block 1030.

As has been described, the present invention provides an improved data processing system, processing unit, cache hierarchy and method of data processing that provide an indication whether or not a memory block is likely to be cached inside or outside of a coherency domain. In accordance with the present invention, the indication, which may be provided by a coherency state, can be established and/or updated in response to the combined response to an exclusive access operation.

While the invention has been particularly shown as described with reference to a preferred embodiment, it will be understood by those skilled in the art that various changes in form and detail may be made therein without departing from the spirit and scope of the invention.

What is claimed is:

1. A method of data processing in a cache coherent data processing system including at least first and second coherency domains, said method comprising:

in a first cache memory within said first coherency domain of said data processing system, setting a coherency state field associated with a storage location and an address tag to a first data-invalid coherency state that indicates that said address tag is valid and that said storage location does not contain valid data; and in response to snooping an exclusive access operation, said exclusive access opertion specifying a target address matching said address tag and indicating a relative domain location of a requestor that initiated said exclusive access operation, said first cache memory updating said coherency state field from said first data-invalid coherency state to a second data-invalid coherency state that indicates that said address tag is valid, that said storage location does not contain valid data, and whether a target memory block associated with said address tag is cached within said first coherency domain upon successful completion of said exclusive access operation based upon said relative domain location of said requestor; wherein:

said exclusive access operation comprises a first exclusive access operation;

said setting comprises setting said coherency state field to said first data-invalid coherency state in response to a second exclusive access operation initiated by a second cache memory of said data processing system; and said first cache memory predicting, by reference to said coherency state field, a scope of broadcast transmission of a data access request targeting said memory block.

* * * * *